US012669816B2

(12) United States Patent
Ko

(10) Patent No.: US 12,669,816 B2
(45) Date of Patent: Jun. 30, 2026

(54) VEHICLE CONTROL METHOD AND SERVER

(71) Applicant: FOXCONN INTERCONNECT TECHNOLOGY LIMITED, Grand Cayman (KY)

(72) Inventor: Chung-Nan Ko, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 275 days.

(21) Appl. No.: 18/224,626

(22) Filed: Jul. 21, 2023

(65) Prior Publication Data

US 2024/0201688 A1 Jun. 20, 2024

(30) Foreign Application Priority Data

Dec. 14, 2022 (CN) .......................... 202211607988.9

(51) Int. Cl.
G05D 1/00 (2024.01)
B60L 58/12 (2019.01)

(52) U.S. Cl.
CPC ............ G05D 1/0027 (2013.01); B60L 58/12 (2019.02); *B60L 2240/10* (2013.01); *B60L 2260/40* (2013.01)

(58) Field of Classification Search
CPC . G08B 13/19647; G05D 1/0027; B60L 58/12; B60L 2240/10; B60L 2260/40; H04N 7/181; H04N 5/76; H04L 67/12; H04L 67/125
See application file for complete search history.

(56) References Cited

U.S. PATENT DOCUMENTS

2019/0283709 A1* 9/2019 Lu ........................... H04N 7/183
2021/0347333 A1* 11/2021 Nagao ................... H04W 4/029
2022/0041131 A1* 2/2022 Lee ....................... B60R 25/102

FOREIGN PATENT DOCUMENTS

CN      113807117      12/2021
CN      114510052      5/2022
CN      115399138      11/2022
(Continued)

OTHER PUBLICATIONS

Machine translation of JP-2006036066-A (Year: 2006).*
Machine translation of JP-2019175234-A (Year: 2019).*
Machine translation of JP-2020132073-A (Year: 2020).*

*Primary Examiner* — Navid Z. Mehdizadeh
*Assistant Examiner* — Caitlin R Mccleary
(74) *Attorney, Agent, or Firm* — ScienBiziP, P.C.

(57) ABSTRACT

A vehicle control method applied to a server is provided. In the method, the server receives vehicle data from multiple vehicles and selects a target vehicle from the multiple vehicles according to the received vehicle data, and generates a first control instruction based on a target monitoring device in response that the target vehicle includes the target monitoring device and sends the first control instruction to the target vehicle, and receives target monitoring data sent by the target vehicle after the target vehicle executing the first control instruction, and generates a second control instruction according to the target monitoring data and the first control instruction and sends the second control instruction to the target vehicle. The method can improve an endurance of a battery of the vehicle.

10 Claims, 5 Drawing Sheets

(56)          References Cited

FOREIGN PATENT DOCUMENTS

JP        2006036066  A  *   2/2006
JP        2009200878          9/2009
JP        2019175234  A  *  10/2019
JP        2020132073  A  *   8/2020

* cited by examiner

1

2

VEHICLE CONTROL METHOD AND SERVER

FIELD

The present disclosure relates to a field of vehicular networking technology, in particular to a vehicle control method, and a server.

BACKGROUND

When a vehicle uses a sentry mode for monitoring security of the vehicle, all cameras of the vehicle will be turned on. Then power consumption of the vehicle will increase, and an endurance of a battery of the vehicle will decrease.

DETAILED DESCRIPTION

Figure 1:
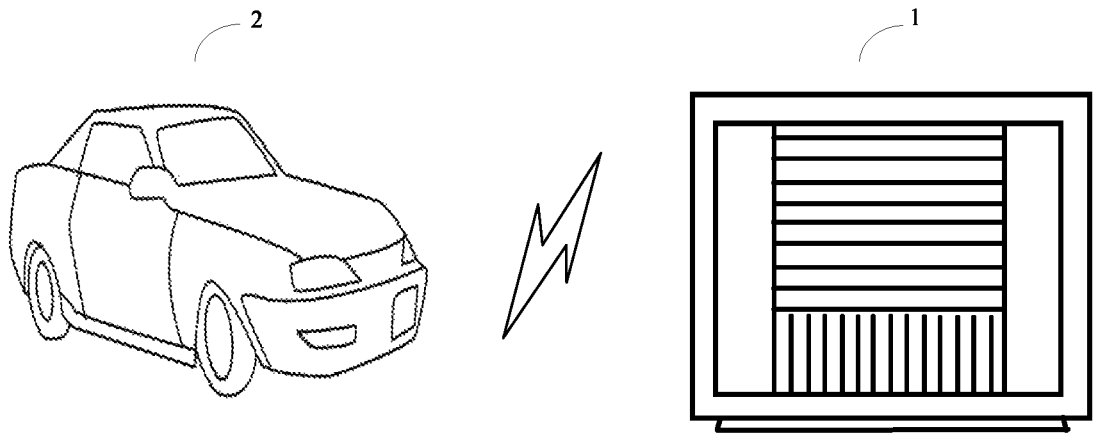
FIG. 1 is a schematic diagram of an application scenario of a vehicle control method provided by an embodiment of the present disclosure.

Plurality of embodiments are described in the present disclosure, but the description is exemplary rather than limiting, and there may be more embodiments and implementation solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

When describing representative embodiments, the specification may present methods and/or processes as a specific sequence of steps. However, to the extent that the method or process does not depend on the specific order of steps described in the present disclosure, the method or process should not be limited to the specific order of steps described. As understood by those of ordinary skills in the art, other orders of steps are also possible. Therefore, the specific order of steps set forth in the specification should not be interpreted as limitation to the claims. In addition, the claims for the method and/or process should not be limited to the steps performed in the written order, and those of skill in the art may readily understand that these orders may vary and still remain within the essence and scope of the embodiments of the present disclosure.

Unless otherwise defined, technical terms or scientific terms used in the embodiments shall have their common meanings as construed by those of ordinary skills in the art to which the present disclosure pertains. The terms "first", "second" and the like used in the embodiments of the present disclosure do not represent any order, quantity, or importance, but are merely used to distinguish between different components. The terms "include", "contain" or the like mean that elements or articles appearing before such terms may cover elements or articles listed after the words and their equivalents without excluding other elements or articles. The terms "connect", "link" or the like are not limited to physical or mechanical connection, but may include electrical connections, whether direct or indirect.

FIG. 1 is a schematic diagram of an application scenario of a vehicle control method provided by an embodiment of the present disclosure. In one embodiment, the vehicle control method of the present disclosure may be applied to one or more servers 1 and one or more vehicle-mounted devices 2. The server 1 communicates with the vehicle-mounted device 2. The server 1 receives vehicle data and generate instructions by analyzing the received vehicle data and sends the instructions to the vehicle-mounted device 2. The server 1 and the vehicle-mounted device 2 shown in FIG. 1 are examples only. The vehicle-mounted device 2 may be a device configured in the vehicle, or the vehicle-mounted device 2 may also be one or more electronic devices communicating with a device configured in the vehicle. The vehicle may be any kind of vehicle that uses a battery as an energy source. The vehicle can use a controller, a motor, and other components to convert electrical energy of the battery into mechanical energy movement so as to change the speed of the vehicle by controlling magnitude of current in the battery.

In at least one embodiment, the server 1, the vehicle-mounted device 2, and a terminal communicating with the vehicle-mounted device 2 constitute a vehicle networking system.

In at least one embodiment, the server 1 is a device capable of automatically calculating parameter values and/ or information processing in accordance with pre-set or stored instructions. A hardware of the server includes, but is not limited to, a microprocessor, an application specific integrated circuit (Application Specific Integrated Circuit, ASIC), a field-programmable gate array (Field-Programmable Gate Array, FPGA), a digital signal processor (Digital Signal Processor, DSP), an embedded device and so on.

In at least one embodiment, the server 1 may be a network device and/or a computer device. The network device includes, but is not limited to, a single network server, a server group that includes a plurality of network servers, or a cloud that includes a large number of hosts or network servers.

In at least one embodiment, the vehicle-mounted device 2 is a device capable of automatically calculating parameter values and/or information processing in accordance with pre-set or stored instructions. A hardware of the vehicle-mounted device 2 includes, but is not limited to, a microprocessor, an application specific integrated circuit (Application Specific Integrated Circuit, ASIC), a field-programmable gate array (Field-Programmable Gate Array, FPGA), a digital signal processor (Digital Signal Processor, DSP), an embedded device and so on.

In at least one embodiment, the vehicle-mounted device 2 may be any kind of electronic device that can interact with a user human-computer. For example, the vehicle-mounted device 2 may be a personal computer, a tablet computer, a smart phone, a personal digital assistant (Personal Digital Assistant, PDA), a game console, an interactive internet protocol television (Interactive Internet Protocol Television, IPTV), a smart wearable device, and so on.

In at least one embodiment, the vehicle-mounted device 2 may further include a network device and/or a user equipment. The network device includes, but is not limited to, a single network server, a server group that includes a plurality of network servers, or a cloud that includes a large number of hosts or network servers.

Figure 2:
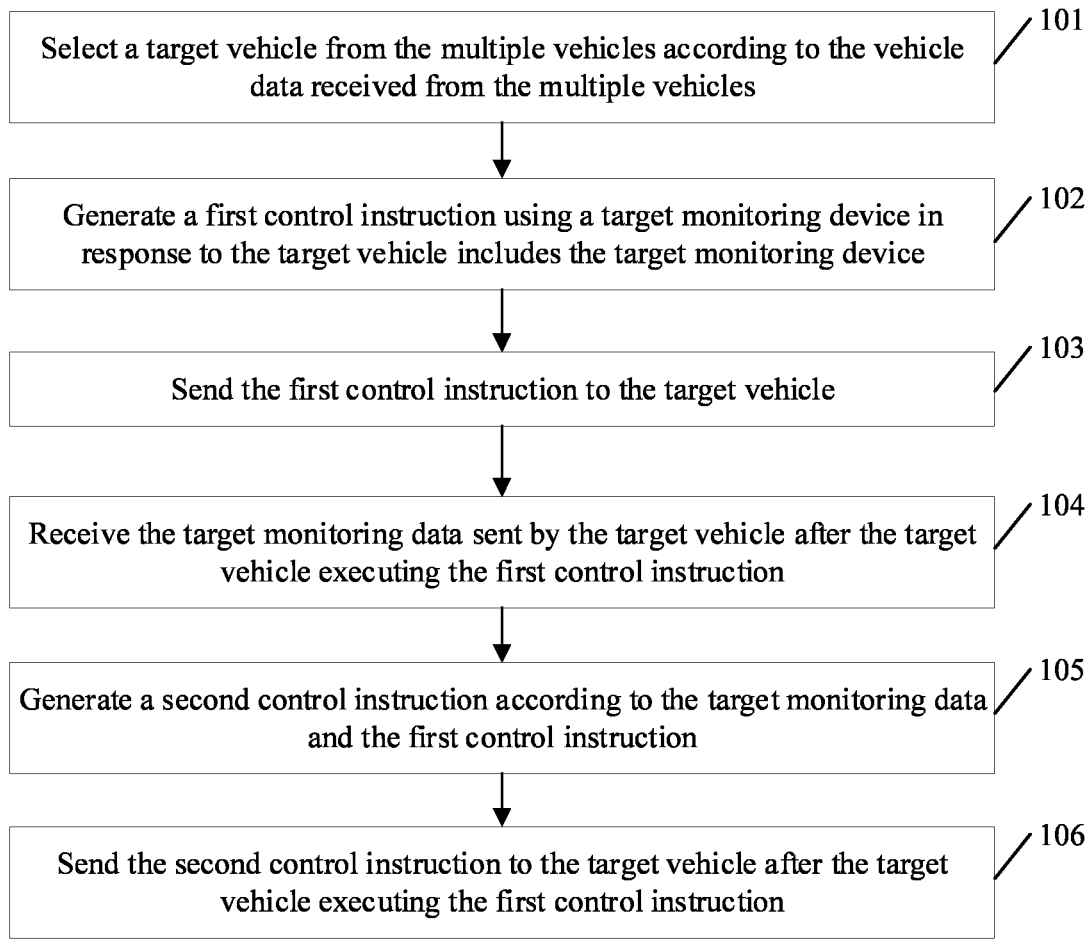
FIG. 2 is a flowchart of a vehicle control method provided by an embodiment of the present disclosure.

In at least one embodiment, the network between the server 1 and the vehicle-mounted device 2 includes, but is not limited to the Internet, a wide area network, a metro network, a local area network, a virtual private network (Virtual Private Network, VPN) and the like. FIG. 2 is a flowchart of the vehicle control method provided by an embodiment of the present disclosure. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The vehicle control method shown in FIG. 2 is executed by a server (e.g., server 1 in FIG. 1).

Figure 3:
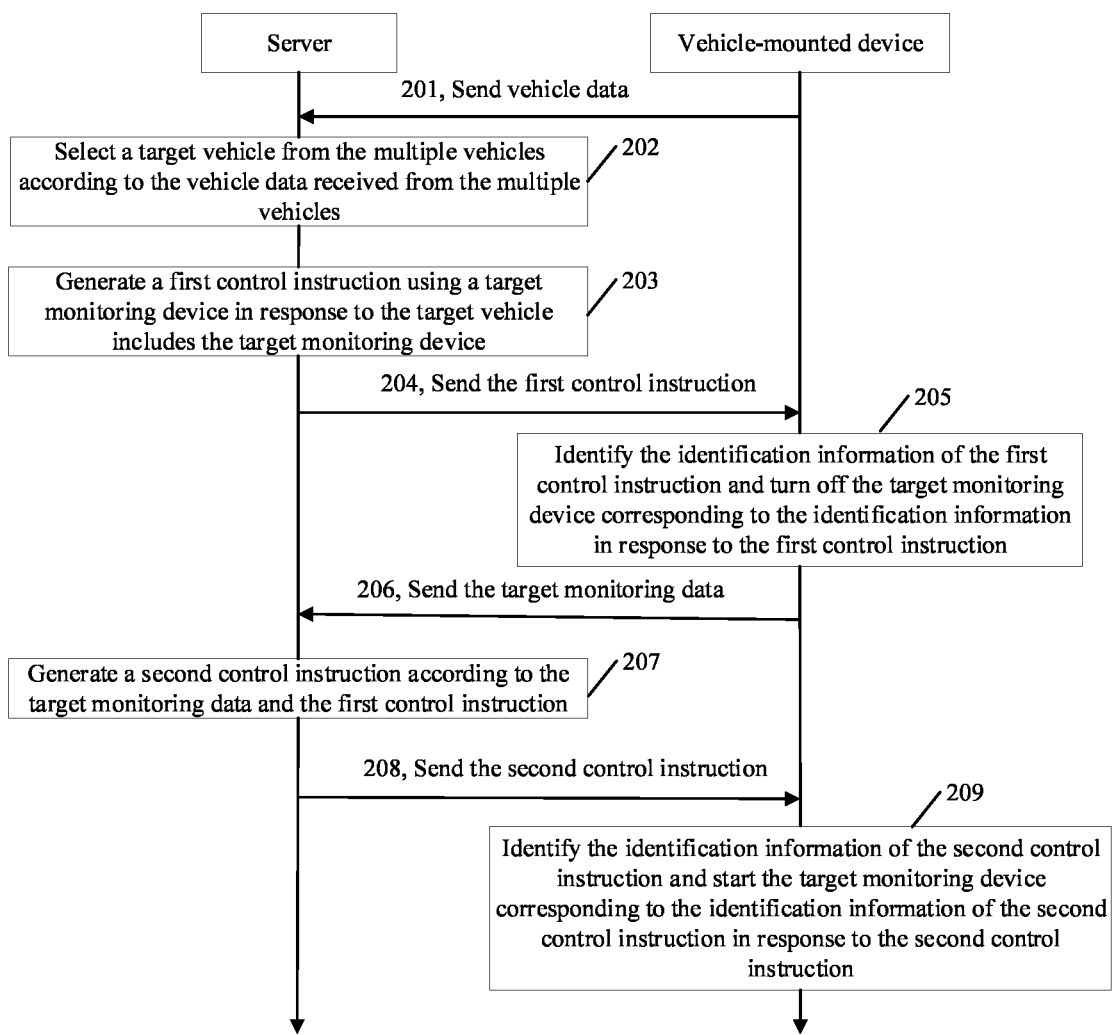
FIG. 3 is an interactive flowchart of a vehicle control method provided by an embodiment of the present disclosure.

The blocks shown in FIG. 2 is a flowchart executed on the server, in order to more clearly and completely introduce the data interaction process between the server and the vehicle-mounted device of the vehicle control method, the interaction process is first explained in detail in conjunction with FIG. 3 below. FIG. 3 is an interactive flowchart of the vehicle control method provided by an embodiment of the present disclosure. Each block shown in FIG. 3 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. Some blocks shown in FIG. 3 may be executed by the server (e.g., the server 1 in FIG. 1), and some blocks shown in FIG. 3 may executed by the vehicle-mounted device (e.g., vehicle-mounted device 2 in FIG. 1).

At block 201, the vehicle-mounted device sends vehicle data to the server that communicates with the vehicle-mounted device.

In at least one embodiment of the present disclosure, the vehicle-mounted device sends the vehicle data to the server in real time according to a communication protocol. The communication protocol includes communication rules between the server and the vehicle-mounted device, the communication protocol may be cellular vehicle-to-everything (Cellular Vehicle-To-Everything, C-V2X).

In at least one embodiment of the present disclosure, the vehicle data refers to data related to the vehicle, for example, the vehicle data of the vehicle includes initial monitoring data from multiple monitoring device of the vehicle, the number of the multiple monitoring devices, position information of the vehicle, a power ratio, a speed of the vehicle and an acceleration of the vehicle and status information of various preset modes of the vehicle and the like. The preset mode can be a sentry mode. When the vehicle is in a parking state and starts the sentry mode, an owner of the vehicle can view videos from the monitoring devices around the vehicle in real time through a mobile phone and other terminals. Once the vehicle is collided or moved, the monitoring device will record the videos of the environment around the vehicle, and notify the owner through an application (Application, APP) or SMS. And at the same time the video can also be viewed on the terminal. The monitoring device includes a device with shooting or recording function of the vehicle, and usually the monitoring device of the vehicle is multiple. For example, the monitoring device may be a car camera. The state information includes turning on the sentry mode and turning off the sentry mode, the power ratio is equal to a ratio of a current battery level to a full battery level, for example, the power ratio is 70%.

At block 202, the server receives the vehicle data from multiple vehicles and selects a target vehicle from the multiple vehicles according to the vehicle data.

In at least one embodiment of the present disclosure, the vehicle data includes the initial monitoring data, the position information of the vehicle, and the power ratio.

In at least one embodiment of the present disclosure, the initial monitoring data is relevant to each monitor device of each vehicle. The initial monitoring data includes, but is not limited to, a monitoring range of the monitoring device, an installation location of the monitoring device, a monitoring perspective of the monitoring device, and identification information of the monitoring device and the like. For example, when the monitoring device is a car camera, the identification information refers to the information of the monitoring device of the vehicle to which it belongs. The vehicle may install multiple monitoring devices, and the identification information of each monitoring device is unique. For example, the identification information may be a serial number of each monitoring device or the location information of each monitoring device and the like.

In at least one embodiment of the present disclosure, the server receives the vehicle data through the communication protocol. The communication protocol may be the communication rules between the server and the multiple vehicles, the communication protocol may include protocols of the cellular vehicle networking.

In at least one embodiment of the present disclosure, the sever selects multiple adjacent vehicles from the multiple vehicles according to positions of the multiple vehicles. Furthermore, the server selects the target vehicle from the multiple adjacent vehicles according to the initial monitoring information and the power ratio.

In at least one embodiment, the server calculates a distance between any two vehicles of the multiple vehicles according to the positions of the multiple vehicles. The server sets the any two vehicles as intermediate vehicles in response that the distance is less than or equal to a predetermined distance. The server determines the intermediate vehicles to be the adjacent vehicles in response that the intermediate vehicles start the preset mode.

In at least one embodiment of the present disclosure, the preset mode may be the sentry mode, which consumes a lot of power when the vehicle uses the sentry mode. The server detects whether the intermediate vehicles start the preset mode according to the status information of the intermediate vehicle in the preset mode. The status information can include turning on and off the preset mode.

In at least one embodiment, the preset distance can be set by a user, the present disclosure does not restrict this, for example, the preset distance may be 1 meter.

Figure 4:
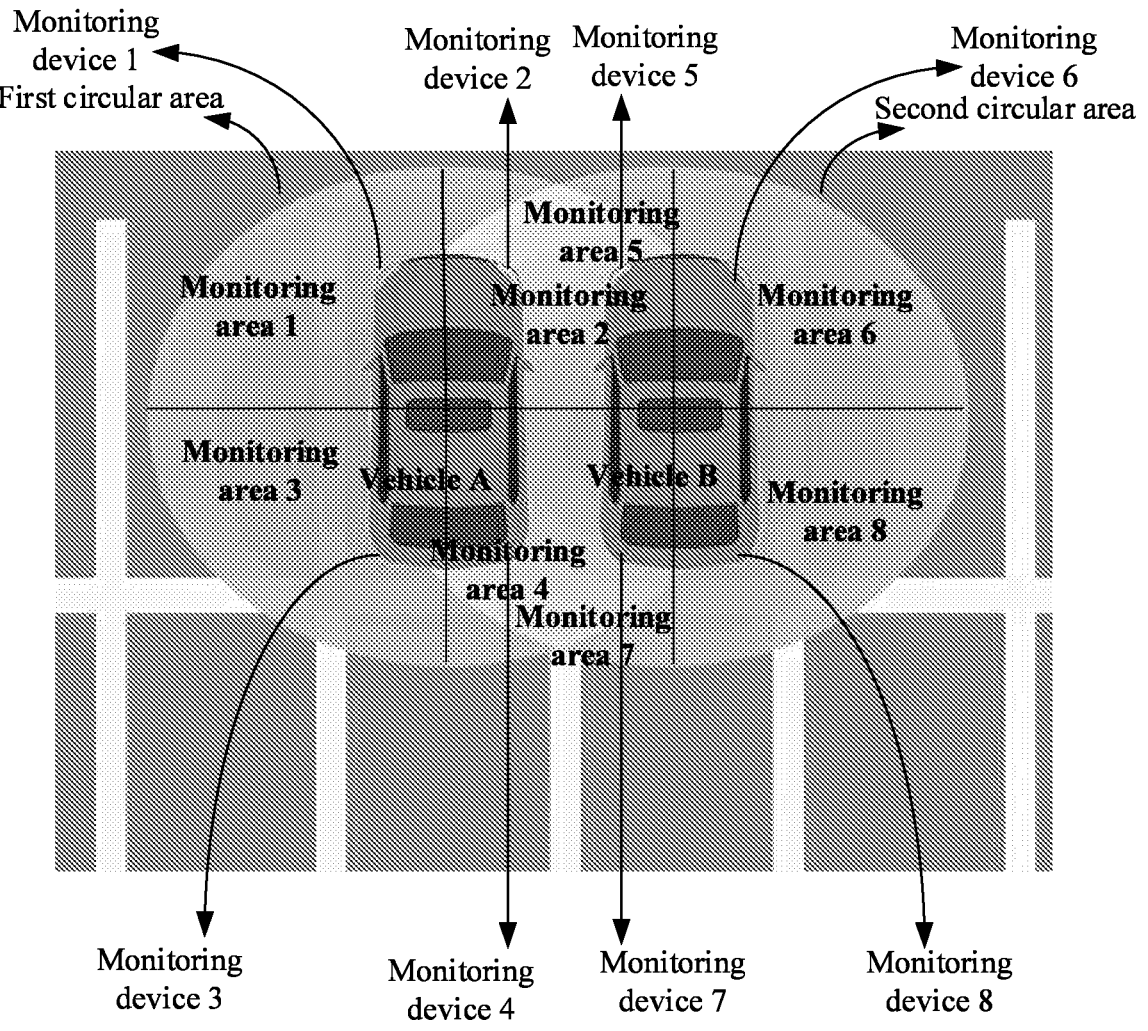
FIG. 4 is a schematic view of a plurality of adjacent vehicles provided by embodiments of the present disclosure.

FIG. 4 is a schematic view of multiple adjacent vehicles provided by embodiments of the present disclosure. The multiple adjacent vehicles and the monitoring devices of the multiple adjacent vehicles shown in FIG. 4 are examples. For example, the vehicle A and the vehicle B are shown in FIG. 4. The vehicle A includes four monitoring devices, which include a monitoring device 1, a monitoring device 2, a monitoring device 3, and a monitoring device 4. The vehicle B includes four monitoring devices, which include a monitoring device 5, a monitoring device 6, a monitoring device 7, and a monitoring device 8. A target monitoring area of the vehicle A is a first circular area centered on the position of the vehicle A. A target monitoring area of the vehicle B is a second circular area centered on the position of the vehicle B. The first circular area overlaps the second circular area, and the overlapped area between the first circular area and the second circular area is an overlapped monitoring area. Then, the vehicle A and the vehicle B are the multiple adjacent vehicles.

In at least one embodiment, since the vehicle data includes the position information of each vehicle and the status information of the sentry mode in each vehicle, it is possible to quickly filter out the vehicles that start the sentry mode and are adjacent to each other from the plurality of vehicles.

In at least one embodiment, the server determines a corresponding target monitoring area of each adjacent vehicle in the surrounding environment according to the initial monitoring data and obtains multiple target monitoring areas. The server determines whether any two target monitoring areas of the multiple target monitoring areas are overlapped. In response that the two target monitoring areas are overlapped, the server determines an overlapped area between any two target monitoring areas to be an overlapped monitoring area and determines the adjacent vehicles corresponding to any two target monitoring areas to be initial vehicles. The server calculates the number of the initial vehicles. The server compares the power ratios of the initial vehicles and determines that the initial vehicle with the lowest power among the initial vehicles to be the target vehicle, in response to the number of the initial vehicles is equal to a preset number. The server selects the target vehicle from the initial vehicles according to the power ratios of the initial vehicles and the positions of the initial vehicles, in response to the number of the initial vehicles is greater than the preset number.

In at least one embodiment, the overlapped monitoring area includes an overlapped area between any two target monitoring areas, and the target monitoring area includes all the monitoring areas corresponding to all monitoring devices of each adjacent vehicle. Typically, the target monitoring area is a 360-degree panoramic area. The initial vehicles may include multiple vehicles, and the preset number may be 2.

In at least one embodiment, when there are more than one monitoring devices in each adjacent vehicle, the initial monitoring data is corresponding to each monitoring device, so that the monitoring device corresponding to the overlapping monitoring area can be accurately determined according to the initial monitoring data.

In at least one embodiment, the server determines an initial vehicle with the lowest power among the plurality of initial vehicles to be the target vehicle, and a position of the target vehicle is in a middle position of the positions of the plurality of initial vehicles, in response that an initial number of the initial vehicles is greater than the preset number. Or the server determines all of the initial vehicles to be the target vehicles in response that the number of the initial vehicles is greater than the initial number.

For example, the server determines that the initial vehicle with the lowest current value of the three multiple initial vehicles and the initial vehicle that is in the middle position of the three initial vehicles as the target vehicle, in response that the predetermined number is two and the initial number of the initial vehicles is three. Or the server determines that all the initial vehicles are the target vehicles in response that the predetermined number is two and the initial number of the initial vehicles is greater than three.

In at least one embodiment, the greater the number of the adjacent vehicles, the greater the number of the target vehicles, and the more power of the target vehicles can be saved.

At block 203, the server generates a first control instruction according to a target monitoring device in response to the target vehicle includes the target monitoring device.

In at least one embodiment of the present disclosure, the target monitoring device is corresponding to the overlapping monitoring area when the target vehicle has a plurality of monitoring devices, and there are several the target monitoring devices.

In at least one embodiment of the present disclosure, the server calculates the number of monitoring devices of the target vehicles according to the vehicle data of the target vehicle. The server determines that no target monitoring device exists for the target vehicle in response to the fact that the number of monitoring devices is one. Or the server determines that exists target monitoring device for the target vehicle in response to the fact that the number of monitoring devices is more than one, and the server identifies the initial monitoring area corresponding to each monitoring device in the target monitoring area of the target vehicle. Further, the server determines the monitoring device corresponding to the initial monitoring area which includes the overlapping monitoring area to be the target monitoring device.

For example, as shown in FIG. 4, when the initial monitoring area of the monitoring device 1 of the vehicle A is a sector-shaped monitoring area 1, the initial monitoring area of the monitoring device 2 is a sector-shaped monitoring area 2, the initial monitoring area of the monitoring device 3 is a sector-shaped monitoring area 3 and the initial monitoring area of the monitoring device 4 is a sector-shaped monitoring area 4, the initial monitoring area of the monitoring device 5 of the vehicle B is a sector-shaped monitoring area 5, the initial monitoring area of the monitoring device 6 is a sector-shaped monitoring area 6, the initial monitoring area of the monitoring device 7 is a sector-shaped monitoring area 7 and the initial monitoring area of the monitoring device 8 is a sector-shaped monitoring area 8. There is an overlapping monitoring area between the monitoring area 2 and the monitoring area 5, and there is an overlapping monitoring area between the monitoring area 4 and the monitoring area 7. The server sets the vehicle A as the target vehicle in response that the power ratio of vehicle A is lower than the power ratio of vehicle B. And the server determines that the monitoring device 2 and the monitoring device 4 are the target monitoring devices.

In at least one embodiment, the server determines that no target monitoring device exists for the target vehicle in response to the fact that the number of monitoring devices is one, which can avoid the inability to obtain any monitoring data of the target vehicle due to the target vehicle turning off the only monitoring device. The server determines that there are existing target monitoring device of the target vehicle in response to the fact that the number of monitoring devices is more than one, the monitoring device corresponding to the initial monitoring area where the overlapping monitoring area is located is determined to be the target monitoring device, and the target monitoring device can be selected according to the initial monitoring area, Thus enabling targeted control of the target monitoring device.

In at least one embodiment of the present disclosure, the server generates the first control instruction according to a preset close instruction and the identification information of the target monitoring device. The preset close instruction can be set by a user.

In at least one embodiment, since the identification information is the only information of the target monitoring device in the target vehicle to which it belongs, the target vehicle can identify the target monitoring device according to the identification information, and accurately control the target monitoring device according to the first control instruction.

At block 204, the server sends the first control instruction to the target vehicle.

In at least one embodiment of the present disclosure, the server sends the first control instruction to the target vehicle based on the communication protocol. The communication protocol may be the communication rules between the server and the multiple vehicles, the communication protocol may include protocols of the cellular vehicle networking.

At block 205, the vehicle-mounted device identifies the identification information of the first control instruction and turns off the target monitoring device corresponding to the identification information in response to the first control instruction which sent from the server.

In other embodiments of the present disclosure, the server determines that there is no overlapping monitoring area between the monitoring device of the vehicle and the monitoring device of other external vehicles in response that the vehicle-mounted device does not receive the first control instruction, the server controls all the monitoring devices in the vehicle are in a monitoring or video recording state.

At block 206, the vehicle-mounted device sends the target monitoring data to the server communicating with the vehicle-mounted device, after executing the first control instruction.

In at least one embodiment of the present disclosure, a process for sending the target monitoring data to the server is basically the same as a process for sending the vehicle data, so the present disclosure will not repeat this.

At block 207, the server receives the target monitoring data sent by the target vehicle and generates a second control instruction according to the target monitoring data and the first control instruction.

In at least one embodiment of the present disclosure, a process for receiving the target monitoring data is basically the same as a process for receiving the vehicle data, so the present disclosure will not repeat this.

In at least one embodiment, the target vehicle usually includes a radar sensor. When the target vehicle executes the first control instruction, the target monitoring device being on a turning off status, and the other monitoring devices in the target vehicle are still turned on, the target monitoring data includes the monitoring image taken by the monitoring device in the open state of the target vehicle and point cloud images recorded by the radar sensor after the radar sensor shooting the initial monitoring area corresponding to the target monitoring device.

In at least one embodiment of the present disclosure, the target monitoring data includes the monitoring image and the point cloud image of monitoring object of the monitoring image. The first control instruction includes the identification information of the target monitoring device.

In at least one embodiment of the present disclosure, the server identifies whether the monitoring object of the monitoring image includes a moving object. The server obtains a moving trajectory of the moving object from the point cloud image in response that the monitoring object includes the moving object. The server generates the second control instruction according to a preset start instruction and the identification information of the target monitoring device when the server determines that the moving object enters the initial monitoring area corresponding to the target monitoring device according to the moving trajectory.

In at least one embodiment, when the monitoring image includes a moving object, the server determines a plurality of moving positions of the moving object according to the plurality of point cloud images taken at different moments and obtains the moving trajectory of the moving object based on the plurality of moving positions. Each point cloud image includes a moving position of the moving object at a certain moment.

In at least one embodiment, the moving object may be a moving pedestrian, or a moving animal and the like. The preset start instruction can be set by a user, and the present disclosure is not restricted to this.

In at least one embodiment, the server determines whether the monitoring object of the monitoring image includes a moving object by identifying the monitoring image. When the moving object enters the initial monitoring area corresponding to the target monitoring device, the server generates the second control instruction according to the preset start instruction and the identification information of the target monitoring device, which can fully analyze the vehicle data of the second vehicle to make the second control instruction more accurate.

At block 208, the server sends the second control instruction to the target vehicle after the target vehicle executing the first control instruction.

In at least one embodiment of the present disclosure, a process for sending the second control instruction is basically the same as a process for sending the first control instruction, so the present disclosure will not repeat this.

At block 209, the vehicle-mounted device identifies the identification information of the second control instruction and start the target monitoring device corresponding to the identification information of the second control instruction in response to the second control instruction sent by the server.

In at least one embodiment of the present disclosure, the vehicle control method further includes: the vehicle-mounted device compares the power ratio with a preset threshold after the vehicle-mounted device obtains the power ratio of the vehicle. The vehicle-mounted device turns off the preset mode of the vehicle in response that the power ratio is less than the preset threshold and sends preset notification information to a terminal communicating with the vehicle-mounted device.

The preset mode is a sentry mode, the preset threshold can be set by a user, and the present disclosure is not restricted thereon. For example, the preset threshold can be 20%.

The preset notification information may be a prompt message to close the sentry mode or a prompt message to close the sentry mode due to insufficient power. The terminal may be any kind of electronic device capable of communicating with the vehicle, for example, the terminal may be a personal computer, tablet, smartphone, personal digital assistant (Personal Digital Assistant, PDA), game console, interactive internet protocol television (Interactive Internet Protocol Television, IPTV), smart wearable device, etc.

In at least one embodiment, when the power ratio is less than the preset threshold, the vehicle closes the sentry mode, which can save the power of the vehicle. In addition, according to the notification information to remind the owner of the vehicle, so that the owner can obtain the power information of the vehicle or the state of the sentry mode in time, which can improve user experience.

In at least one embodiment, the server selects the target vehicle from the plurality of vehicles according to the vehicle data received from the plurality of vehicles. The server selects the adjacent multiple vehicles which turns on the sentry mode according to the positions of the vehicles and status information of the sentry mode from the vehicle data. As the vehicle data further includes initial monitoring data and the power ratio of each vehicle. When there is an overlapping monitoring area exists between the plurality of the target vehicles, all the target vehicles start the target monitoring devices will cause unnecessary waste of the power of the battery of each target vehicle, the server can determine whether the target vehicles include any target monitoring device, and the server can generate the first control instruction and send the first control instruction to the target vehicles to turn off the target monitoring devices in response that the number of the target monitoring devices is more than one, which can effectively reduce the impact of the sentry mode on the power consumption of the target vehicle, and then can improve the endurance of the target vehicle. The server can determine there is no target monitoring device of the target vehicle in response that the number of the target monitoring devices is one, which avoid the target vehicle close the only monitoring device, resulting in obtaining no monitoring data of the target vehicle.

Further, the server generates a second control instruction according to the target monitoring data and sends the second control instruction to the target vehicle after the execution of the first control instruction. The server sends the second control instruction to the target vehicle to start the target monitoring device corresponding to the overlapping monitoring area. As the target monitoring data includes a monitoring image of the monitoring device that is not closed and a point cloud of the monitoring object in the monitoring image, therefore, by analyzing the monitoring image and the point cloud image, the server can determine whether a moving object enters the initial monitoring area corresponding to the target monitoring device, and can make the target vehicle receiving the second control instruction restart the turned off target monitoring device for recording video, so as to avoid the problem that the initial monitoring area corresponding to the target monitoring device is not recorded when a moving object enters the initial monitoring area corresponding to the target monitoring device.

In at least one embodiment, the vehicle-mounted device sends the vehicle data of the vehicle to the server communicating with the vehicle and controls the target monitoring device of the vehicle according to the received second control instruction. As the vehicle-mounted device does not need to analyze the vehicle data, which can improve the endurance of the vehicle.

FIG. 2 is a flowchart of a vehicle control method provided by an embodiment of the present disclosure. Based on the interaction process shown in FIG. 3, the vehicle control method implemented on the server as shown in FIG. 2 include the following blocks:

At block 101, the server selects a target vehicle from the multiple vehicles according to the vehicle data received from the multiple vehicles.

At block 102, the server generates a first control instruction using a target monitoring device in response to the target vehicle includes the target monitoring device.

At block 103, the server sends the first control instruction to the target vehicle.

At block 104, the server receives the target monitoring data sent by the target vehicle after the target vehicle executing the first control instruction.

At block 105, the server generates a second control instruction according to the target monitoring data and the first control instruction.

At block 106, the server sends the second control instruction to the target vehicle after the target vehicle executing the first control instruction.

Figure 5:
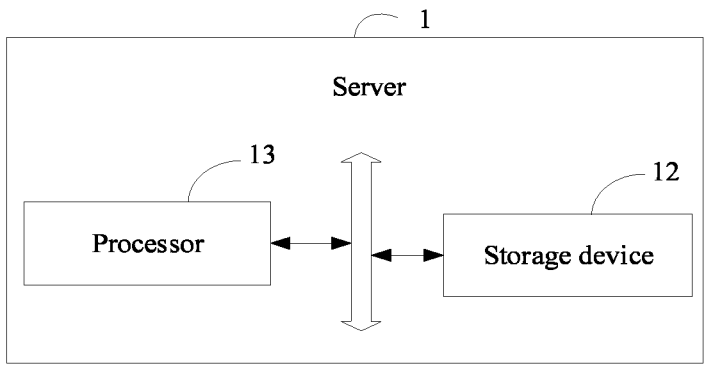
FIG. 5 is a schematic structural diagram of a server provided by an embodiment of the present disclosure.

FIG. 5 is a schematic structural diagram of a server provided by an embodiment of the present disclosure. In at least one embodiment, the server 1 includes a storage device 12, at least one processor 13, and a computer program that is stored in the storage device 12 and can be executed on the processor 13, such as a vehicle control program.

Those skilled in the art should understand that the structure of the electronic device shown in FIG. 5 does not constitute a limitation of the embodiment of the present disclosure, more or less other hardware or software, or a different arrangement of components. For example, the server 1 may also include an input and output device, a network access device, a bus, and the like.

In some embodiments, the at least one processor 13 may be a central processing unit (Central Processing Unit, CPU), may also be other general-purpose processors, digital signal processors (Digital Signal Processors, DSP), application specific integrated circuits (Application Specific Integrated Circuits, ASICs), field programmable gate arrays (Field-Programmable Gate Array, FPGA) or other programmable logic devices, discrete gates or transistor logic devices, discrete hardware components, etc. The general-purpose processor may be a micro-processor or the processor may also be any conventional processor, and so on. The at least one processor 13 is the computing core and control center of the server 1, using various interfaces and lines to connect the entire server 1 parts, and obtain the server 1 operating system and installed various applications, program code, etc.

In at least one embodiment, the at least one processor 13 obtains an operating system of the server 1 and various installed application programs. The at least one processor 13 obtains the application program to implement the blocks in the embodiments of the above-mentioned vehicle control method, as shown in FIG. 1 and FIG. 2.

In at least one embodiment, when the integrated modules/units of the server 1 are realized in the form of software function units and sold or used as independent products, they can be stored in a computer-readable storage medium. The present disclosure realizes all or part of the processes in the methods of the above embodiments and can also be completed by instructing related hardware through computer programs, and the computer programs can be stored in a computer-readable storage medium. When the computer program is acquired by the processor, it can realize the blocks of the above-mentioned various method embodiments.

In some embodiments, the storage device 12 is used to store program codes and various data. The storage device 12 includes a read-only memory (Read-Only Memory, ROM), a programmable read-only memory (Programmable Read-Only Memory, PROM), an erasable programmable read-only memory (Erasable Programmable Read-Only Memory, EPROM), One-time Programmable Read-Only Memory (OTPROM), Electronically Erasable Programmable Read-Only Memory (EEPROM), Compact Disc Read-Only Memory (EEPROM), Only Memory, CD-ROM) or other optical disk storage, magnetic disk storage, tape storage, or any other computer-readable storage medium that can be used to carry or store data.

The storage device 12 may be an external memory and/or internal memory of server 1. Further, the storage device 12 may be a memory having a physical form, such as a memory module, TF card (Trans-flash Card) and the like.

The module/unit integrated in server 1 may be stored in a computer-readable storage medium if implemented in the form of a software functional unit and sold or used as a separate product. Based on this understanding, the present disclosure implements all or part of the process in the method of the above embodiment, and may also be completed by instructing the relevant hardware by a computer program, the computer program may be stored in a computer-readable storage medium, and the computer program may realize the steps of each embodiment of the above method when it is obtained by the processor.

Wherein the computer program includes computer program code, the computer program code may be in the form of source code, object code form, obtainable files or some intermediate forms, etc. The computer-readable medium may comprise: any entity or device capable of carrying the computer program code, recording medium, U disk, portable hard disk, disk, optical disk, computer memory, read-only memory (Read-Only Memory, ROM).

Referring to FIG. 2 or FIG. 3, the storage device 12 of the server 1 stores a plurality of instructions to implement the vehicle control method, and the processor 13 selects a target vehicle from the multiple vehicles according to vehicle data received from the multiple vehicles, generates a first control instruction according to a target monitoring device in response to the target vehicle includes the target monitoring device, and sends the first control instruction to the target vehicle, and receives the target monitoring data sent by the target vehicle after the target vehicle executing the first control instruction, and generates a second control instruction according to the target monitoring data and the first control instruction, and sends the second control instruction to the target vehicle after the target vehicle executing the first control instruction.

Specifically, for the specific implementation method of the above instructions by the processor 13, reference may be made to the description of relevant blocks in the embodiment corresponding to FIG. 2 or FIG. 3, and details are not repeated here.

Figure 6:
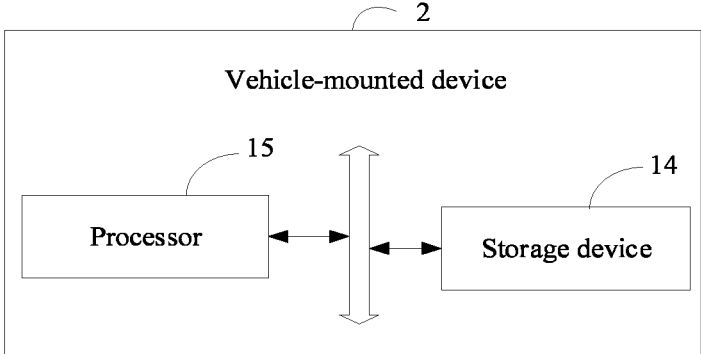
FIG. 6 is a schematic structural diagram of a vehicle-mounted device provided by an embodiment of the present disclosure.

FIG. 6 is a schematic structural diagram of a vehicle-mounted device provided by an embodiment of the present disclosure. In at least one embodiment, the vehicle-mounted device 2 includes a storage device 14, at least one processor 15, and a computer program that is stored in the storage device 14 and can be executed on the processor 15, such as a vehicle control program.

Those skilled in the art should understand that the structure of the electronic device shown in FIG. 6 does not constitute a limitation of the embodiment of the present disclosure, more or less other hardware or software, or a different arrangement of components. For example, the vehicle-mounted device 2 may also include an input and output device, a network access device, a bus, and the like.

Referring to FIG. 2, the storage device 14 of the vehicle-mounted device 2 stores a plurality of instructions to implement the vehicle control method, and the processor 15 sends vehicle data to the sever that communicates with the vehicle-mounted device, identifies the identification information of the first control instruction and turns off the target monitoring device corresponding to the identification information in response to the first control instruction which sent from the server, and identifies the identification information of the second control instruction and turns on the target monitoring device corresponding to the identification information of the second control instruction in response to the second control instruction sent by the server, and obtains the power ratio of the vehicle, and compares the power ratio with a preset threshold, turns off the preset mode of the vehicle in response that the power ratio is less than the preset threshold and sends preset notification information to a terminal communicating with the vehicle-mounted device.

Specifically, for the specific implementation method of the above instructions by the processor 15, reference may be made to the description of relevant blocks in the embodiment corresponding to FIG. 3, and details are not repeated here.

It is understood that the division of modules described above is a logical functional division, and there can be another division in actual implementation. In addition, each functional module in each embodiment of the present disclosure may be integrated in the same processing unit, or each module may physically exist separately, or two or more modules may be integrated in the same unit. The above integrated modules can be implemented either in the form of hardware or in the form of hardware plus software functional modules. The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A vehicle control method using a server, the method comprising:

receiving vehicle data from a plurality of vehicles and selecting a target vehicle from the plurality of vehicles according to the received vehicle data, wherein the vehicle data comprises initial monitoring data, positions of the plurality of vehicles, and power ratios of the plurality of vehicles, selecting the target vehicle from the plurality of vehicles according to the received vehicle data further comprises: selecting a plurality of adjacent vehicles from the plurality of vehicles according to the positions of the plurality of vehicles; and selecting the target vehicle from the plurality of adjacent vehicles according to the initial monitoring information and the power ratios of the plurality of adjacent vehicles, comprises: determining a corresponding target monitoring area of each adjacent vehicle in a surrounding environment according to the initial monitoring data, and obtaining a plurality of target monitoring areas; determining whether any two target monitoring areas of the plurality of target monitoring areas are overlapped; determining an overlapped area between the any two target monitoring areas to be an overlapped monitoring area and determining the adjacent vehicles corresponding to the any two target monitoring areas to be initial vehicles, in response that the two target monitoring areas are overlapped; calculating a number of the initial vehicles; determining an initial vehicle with the lowest power among the initial vehicles to be the target vehicle according to the power ratios, in response to the number of the initial vehicles is equal to a preset number; and selecting the target vehicle from the initial vehicles according to the power ratios of the initial vehicles and the positions of the initial vehicles, in response to the number of the initial vehicles is greater than the preset number;

in response that the target vehicle comprises a target monitoring device, generating a first control instruction according to the target monitoring device, and sending the first control instruction to the target vehicle;

receiving target monitoring data sent by the target vehicle after the target vehicle executes the first control instruction; and generating a second control instruction according to the target monitoring data and the first control instruction, and sending the second control instruction to the target vehicle.

2. The vehicle control method according to claim 1, wherein selecting the target vehicle from the plurality of vehicles according to the received vehicle data further comprises:

calculating a distance between any two vehicles of the plurality of vehicles according to the positions of the plurality of vehicles;

setting the any two vehicles as intermediate vehicles in response that the distance is less than or equal to a predetermined distance; and determining the intermediate vehicles to be adjacent vehicles in response that the intermediate vehicles start a preset mode.

3. The vehicle control method according to claim 1, wherein selecting the target vehicle from the initial vehicles according to the power ratios of the initial vehicles and the positions of the initial vehicles further comprises:

determining the initial vehicle with the lowest power among the plurality of initial vehicles to be the target vehicle and a position of the target vehicle is in a middle position of the positions of the initial vehicles, in response that an initial number of the plurality of initial vehicles is greater than the preset number.

4. The vehicle control method according to claim 3, wherein the method further comprises:

calculating a number of monitoring devices of the target vehicle according to the vehicle data of the target vehicle;

identifying an initial monitoring area corresponding to each monitoring device in the target monitoring area of the target vehicle in response that the number of monitoring devices is more than one;

determining an initial monitoring area that comprises the overlapped monitoring area; and determining the monitoring device corresponding to the determined initial monitoring area to be the target monitoring device.

5. The vehicle control method according to claim 1, wherein generating a second control instruction according to the target monitoring data and the first control instruction further comprises:

determining whether a monitoring object of a monitoring image of the target monitoring data comprises a moving object;

obtaining a moving trajectory of the moving object from a point cloud image of the target monitoring data in response that the monitoring object comprises the moving object; and generating the second control instruction according to a preset start instruction and the identification information of the target monitoring device, in response that the moving object enters the initial monitoring area corresponding to the target monitoring device according to the moving trajectory.

6. A server comprising:

a storage device;

at least one processor; and the storage device storing one or more programs, which when executed by the at least one processor, cause the at least one processor to:

receive vehicle data from a plurality of vehicles and select a target vehicle from the plurality of vehicles according to the received vehicle data, wherein the vehicle data comprises initial monitoring data, positions of the plurality of vehicles, and power ratios of the plurality of vehicles, the select the target vehicle from the plurality of vehicles according to the received vehicle data further comprises: select a plurality of adjacent vehicles from the plurality of vehicles according to the positions of the plurality of vehicles; and select the target vehicle from the plurality of adjacent vehicles according to the initial monitoring information and the power ratios of the plurality of adjacent vehicles, comprises: determine a corresponding target monitoring area of each adjacent vehicle in a surrounding environment according to the initial monitoring data, and obtain a plurality of target monitoring areas; determine whether any two target monitoring areas of the plurality of target monitoring areas are overlapped; determine an overlapped area between the any two target monitoring areas to be an overlapped monitoring area and determine the adjacent vehicles corresponding to the any two target monitoring areas to be initial vehicles, in response that the two target monitoring areas are overlapped; calculate a number of the initial vehicles; determine an initial vehicle with the lowest power among the initial vehicles to be the target vehicle according to the power ratios, in response to the number of the initial vehicles is equal to a preset number; and select the target vehicle from the initial vehicles according to the power ratios of the initial vehicles and the positions of the initial vehicles, in response to the number of the initial vehicles is greater than the preset number;

in response that the target vehicle comprises a target monitoring device, generate a first control instruction according to the target monitoring device, and send the first control instruction to the target vehicle;

receive target monitoring data sent by the target vehicle after the target vehicle executes the first control instruction; and generate a second control instruction according to the target monitoring data and the first control instruction, and send the second control instruction to the target vehicle.

7. The server according to claim 6, wherein the at least one processor selects a target vehicle from the plurality of vehicles according to the received vehicle data by:

calculating a distance between any two vehicles of the plurality of vehicles according to the positions of the plurality of vehicles;

setting the any two vehicles as intermediate vehicles in response that the distance is less than or equal to a predetermined distance; and determining the intermediate vehicles to be adjacent vehicles in response that the intermediate vehicles start a preset mode.

8. The server according to claim 6, wherein the at least one processor selects the target vehicle from the initial vehicles according to the power ratios of the initial vehicles and the positions of the initial vehicles by:

determining an initial vehicle with the lowest power among the plurality of initial vehicles to be the target vehicle and a position of the target vehicle is in a middle position of the positions of the initial vehicles, in response that an initial number of the plurality of initial vehicles is greater than the preset number.

9. The server according to claim 6, wherein the at least one processor is further caused to:

calculate a number of monitoring devices of the target vehicle according to the vehicle data of the target vehicle;

identify an initial monitoring area corresponding to each monitoring device in the target monitoring area of the target vehicle in response that the number of monitoring devices is more than one;

determine an initial monitoring area that comprises the overlapped monitoring area; and determine the monitoring device corresponding to the determined initial monitoring area to be the target monitoring device.

10. The server according to claim 6, wherein the at least one processor generates a second control instruction according to the target monitoring data and the first control instruction by:

determining whether a monitoring object of a monitoring image of the target monitoring data comprises a moving object;

obtaining a moving trajectory of the moving object from a point cloud image of the target monitoring data in response that the monitoring object comprises the moving object; and generating the second control instruction according to a preset start instruction and the identification information of the target monitoring device, in response that the moving object enters the initial monitoring area corresponding to the target monitoring device according to the moving trajectory.

* * * * *